(12) United States Patent
Subramani et al.

(10) Patent No.: US 9,647,867 B2
(45) Date of Patent: May 9, 2017

(54) WIDEBAND IQ MISMATCH CORRECTION FOR DIRECT DOWN-CONVERSION RECEIVER

(71) Applicant: TEXAS INSTRUMENTS INCORPORATED, Dallas, TX (US)

(72) Inventors: Karthik Khanna Subramani, Chennai (IN); Nagarajan Viswanathan, Bangalore (IN); Avinash Vasudev Sakleshpur, Bangalore (IN); Jaiganesh Balakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/962,286

(22) Filed: Dec. 8, 2015

(65) Prior Publication Data
US 2016/0373288 A1     Dec. 22, 2016

Related U.S. Application Data

(60) Provisional application No. 62/182,187, filed on Jun. 19, 2015.

(51) Int. Cl.
| | | |
|---|---|---|
| H04B 10/06 | (2006.01) | |
| H04L 27/38 | (2006.01) | |
| H04B 1/10 | (2006.01) | |

(52) U.S. Cl.
CPC ....... *H04L 27/3863* (2013.01); *H04B 1/1036* (2013.01)

(58) Field of Classification Search
CPC ...... H04B 1/1036; H04B 1/10; H04L 27/3863
See application file for complete search history.

(56) References Cited

U.S. PATENT DOCUMENTS

| | | | | |
|---|---|---|---|---|
| 7,515,896 B1 * | 4/2009 | Sorrells | ............... | H03D 7/00 375/343 |
| 8,379,760 B2 * | 2/2013 | Petilli | ............... | H04B 1/001 341/144 |
| 2002/0033766 A1 * | 3/2002 | Pratt | ............... | G01S 19/21 342/357.63 |

(Continued)

*Primary Examiner* — Dzung Tran
(74) *Attorney, Agent, or Firm* — Ronald O. Neerings; Charles A. Brill; Frank D. Cimino (57) ABSTRACT

A direct down-conversion (DDC) front end receiver includes first Q-channel that filters a sum of PRBS and baseband quadrature signals to generate a first filtered quadrature signal, a second Q-channel that filters a difference of the baseband and PRBS signals to generate a second filtered quadrature signal, a first I-channel and a second I-channel, Q-path and I-path PRBS cancellation blocks for cancelling corresponding PRBS components from sum of first and second filtered quadrature signals and sum of first and second filtered inphase signals respectively, Q-path and I-path sum filter estimation blocks for estimating quadrature and inphase sum filter responses. An IQ mismatch compensation filter estimate and tracking block estimates IQ mismatch compensation filter response from estimated quadrature and inphase sum filter responses, and an IQ mismatch compensation filter filters the modified inphase signal with the IQ mismatch compensation filter response, to generate a filter compensated inphase signal.

17 Claims, 7 Drawing Sheets

(56) References Cited

U.S. PATENT DOCUMENTS

| | | | | |
|---|---|---|---|---|
| 2002/0181626 A1* | 12/2002 | Sung | ............ | H04B 1/707 375/347 |
| 2003/0012307 A1* | 1/2003 | Martin | ............ | H04L 27/2332 375/324 |
| 2012/0252394 A1* | 10/2012 | Balakrishnan | ......... | H04B 1/405 455/313 |

* cited by examiner

WIDEBAND IQ MISMATCH CORRECTION FOR DIRECT DOWN-CONVERSION RECEIVER

CROSS REFERENCE TO RELATED APPLICATIONS

This application claims the benefit of U.S. Provisional Patent Application No. 62/182,187, filed Jun. 19, 2015 and that is incorporated herein by reference.

TECHNICAL FIELD

The present disclosure generally relates to IQ mismatch correction in direct down-conversion receivers and super heterodyne receivers, for example, IQ mismatch correction in multicarrier GSM base station receivers.

BACKGROUND

Figure 1:
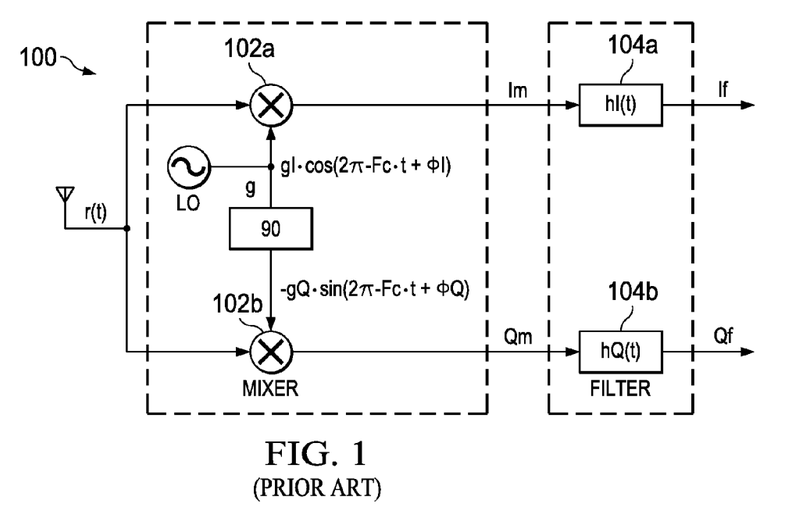
FIG. 1 is a schematic block diagram of a conventional direct-down-conversion (DDC) front end receiver.

FIG. 1 illustrates a conventional direct-down-conversion (DDC) front end receiver 100. At mixers 102a and 102b, an input Radio frequency (RF) signal r(t) is mixed with two orthogonal sinusoids, $2 \cdot gI \cdot \cos(2\pi \cdot Fc \cdot t + \Phi I)$ and $-2 \cdot gQ \cdot \sin(2\pi \cdot Fc \cdot t + \Phi K)$, to generate inphase (Im) and Quadrature (Qm) components respectively, where gI & gQ are amplitudes of sinusoids and $\Phi I$ & $\Phi Q$ are phases of sinusoids. Ideally, gI=gQ for equality of sinusoid amplitude and $\Phi I = \Phi Q$ for sinusoid orthogonality. However, and practically, gI≠gQ and $\Phi I \neq \Phi Q$.

The mixed down baseband (BB) signal ($rm_{bb}(t)$) generated after mixing is given by $rm_{bb}(t) = I_m(t) + j \cdot Q_m(t)$, and is represented by the following expression:

$$rm_{bb}(t) = K_{sig} \cdot s_{bb}(t) + K_{img} \cdot s_{bb}^*(t) \quad (1)$$

Where,
$s_{bb}(t)$ = desired signal $$K_{sig} = \left(\frac{1 + ge^{-j\phi}}{2}\right) \quad K_{img} = \left(\frac{1 - ge^{j\phi}}{2}\right)$$

g (relative gain imbalance) = gQ/gI $\Phi$ (relative phase imbalance) = $\Phi Q = \Phi I$ As seen in equation (1), apart from the desired signal ($s_{bb}(t)$), a scaled version of an undesirable image signal ($s_{bb}(t)$) also appears due to mixer gain and phase impairments. The magnitude of the image signal depends on the relative phase and gain imbalances.

The Inphase ($I_m$) and Quadrature ($Q_m$) components of the mixed down baseband (BB) signal ($rm_{bb}(t)$) pass through first and second low pass filters (104a and 104b respectively) to generate filtered Inphase and Quadrature ($I_f$) and ($Q_f$) components respectively. The overall baseband signal $Rf_{bb}(f)$ (in frequency domain) after filtering is given by $Rf_{bb}(f) = I_f(f) + j \cdot Q_f(f) = I_m(f) \cdot HI(f) + j \cdot Q_m(f) \cdot HQ(f)$, and is represented by the following expression:

$$Rf_{bb}(f) = K_{sig}(f) \cdot S_{bb}(f) + K_{img}(f) \cdot S_{bb}^*(-f) \quad (2)$$

Where, $K_{sig}(f) = \left(\frac{1 + \frac{HQ(f)}{HI(f)} \cdot g \cdot e^{-j\phi}}{2}\right) \cdot HI(f)$ and $\quad (3)$ $$K_{img}(f) = \left(\frac{1 - \frac{HQ^*(-f)}{HI^*(-f)} \cdot g \cdot e^{j\phi}}{2}\right) \cdot HI^*(-f) =$$

$$\left(\frac{1 - \frac{HQ(f)}{HI(f)} \cdot g \cdot e^{j\phi}}{2}\right) \cdot HI(f)$$

$HI(f)$ = impulse response of the first filter 104a
$HQ(f)$ = impulse response of the second filter 104b
$H(f)$ = (relative filter imbalance) = $HQ(f)/HI(f)$ As seen in equation (2), apart from a scaled ($K_{sig}(f)$) version of the desired signal ($S_{bb}(f)$), a scaled ($K_{img}(f)$) version of the image signal ($S^*_{bb}(f)$) also appears due to the relative filter imbalance. The magnitude of the image signal ($S^*_{bb}(-f)$) depends on the relative filter imbalance $H(f) = HQ(f)/HI(f)$.

The mismatch between the inphase and quadrature components causes image signals, making the use of direct down-conversion unfeasible for multicarrier receivers. It is desirable to calibrate IQ mismatch in baseband receivers with an image rejection ratio (IRR) greater than 90 dB. Further, the IQ mismatch calibration should be done in background, as separate calibration duration cannot be availed. Furthermore, the IQ mismatch calibration time should be less than 500 ms and should not significantly affect the GSM BS boot up time.

SUMMARY

This Summary is provided to introduce a selection of concepts in a simplified form that are further described below in the Detailed Description. This Summary is not intended to identify key or important features of the claimed subject matter, nor is it intended to be used as an aid in determining the scope of the claimed subject matter.

A direct down-conversion front end receiver, a direct down-conversion front end receiver, and one or more methods of IQ mismatch correction and calibration are disclosed. In an embodiment, a direct down-conversion front end receiver is disclosed that includes an antenna for receiving an input radio frequency (RF) signal and first and second mixers connected to the antenna, for mixing the input RF signal with first and second orthogonal sinusoid signals for generating baseband quadrature and inphase signals respectively. First and second Q-channels are connected to the first mixer, wherein the first Q-channel adds a baseband pseudo random binary sequence (PRBS) signal to the baseband quadrature signal, and filters the added baseband quadrature signal with a first quadrature filter response, to generate a first filtered quadrature signal, and wherein the second Q-channel subtracts the baseband PRBS signal from the baseband quadrature signal, and filters the subtracted baseband quadrature signal with a second quadrature filter response, to generate a second filtered quadrature signal. Further, first and second I-channels are connected to the second mixer, wherein the first I-channel adds the baseband PRBS signal to the baseband inphase signal, and filters the added baseband inphase signal with a first inphase filter response, to generate a first filtered inphase signal, and the second I-channel subtracts the baseband PRBS signal from the baseband inphase signal, and filters the subtracted baseband inphase signal with a second inphase filter response, to generate a second filtered inphase signal. The direct down-conversion front end receiver further includes Q-path and I-path PRBS cancellation blocks, wherein the Q-path PRBS cancellation block cancels corresponding PRBS component from a sum of the first and the second filtered quadrature signals to generate a modified quadrature signal, and wherein the I-path PRBS cancellation block cancels corresponding PRBS component from a sum of the first and the second filtered inphase signals to generate a modified inphase signal. The direct down-conversion front end receiver furthermore includes Q-path and I-path sum filter estimation blocks, wherein the Q-path sum filter estimation block estimates a quadrature sum filter response from a difference of the first and the second filtered quadrature signals, and wherein the I-path sum filter estimation block estimates an inphase sum filter response from a difference of the first and the second filtered inphase signals. An IQ mismatch compensation filter estimate and tracking block are connected to the Q-path and I-path sum filter estimation blocks, for estimating an IQ mismatch compensation filter response from the estimated quadrature and the inphase sum filter responses. Further, an IQ mismatch compensation filter is connected for filtering the modified inphase signal with the IQ mismatch compensation filter response, to generate a filter compensated inphase signal.

Additionally, in an embodiment, a method of IQ mismatch calibration and compensation in a direct down-conversion front end receiver is disclosed. The method includes receiving an input radio frequency (RF) signal, and mixing the input RF signal with first and second orthogonal sinusoid signals for generating baseband quadrature and inphase signals respectively. The method further includes adding a baseband pseudo random binary sequence (PRBS) signal to the baseband quadrature signal, filtering the added baseband quadrature signal with a first quadrature filter response to generate a first filtered quadrature signal, subtracting the baseband PRBS signal from the baseband quadrature signal, filtering the subtracted baseband quadrature signal with a second quadrature filter response, to generate a second filtered quadrature signal, adding the baseband PRBS signal to the baseband inphase signal, filtering the added baseband inphase signal with a first inphase filter response, to generate a first filtered inphase signal, subtracting the baseband PRBS signal from the baseband inphase signal, and filtering the subtracted baseband inphase signal with a second inphase filter response, to generate a second filtered inphase signal. The method furthermore includes cancelling corresponding PRBS component from a sum of the first and the second filtered quadrature signals to generate a modified quadrature signal, and cancelling corresponding PRBS component from a sum of first and second filtered inphase signals to generate a modified inphase signal. The method further includes estimating a quadrature sum filter response based on a difference of the first and the second filtered quadrature signals, estimating an inphase sum filter response based on a difference of the first and second filtered inphase signals, estimating an IQ mismatch compensation filter response based on the estimated quadrature and the inphase sum filter responses, and filtering the modified inphase signal with the IQ mismatch compensation filter response, to generate a filter compensated inphase signal.

Moreover, in an embodiment, a direct down-conversion front end receiver is disclosed, that includes an antenna for receiving an input radio frequency (RF) signal, a signal adder, connected to the antenna, for adding a pseudo random binary sequence (PRBS) signal of Radio frequency (RF), to the input RF signal to generate a modified input RF signal. First and second mixers are connected to an adder, for mixing the modified input RF signal with first and second orthogonal sinusoid signals for generating baseband quadrature and inphase signals respectively. First and second low pass filters (LPFs) are connected to the first and second mixers respectively, for filtering the baseband quadrature and inphase signals with quadrature and inphase filter responses, for generating filtered quadrature and inphase signals respectively. First and second Analog to Digital Converters (ADCs) are connected to the first and second low pass filters (LPFs), for converting the filtered quadrature and inphase signals to a digital form. An adder is connected to the first and the second ADCs for receiving and adding the digitized filtered quadrature and inphase signals, to generate an overall down-converted complex baseband signal, wherein the overall down-converted baseband signal includes baseband input and PRBS signals filtered by a signal transfer function, and the baseband input and PRBS image signals filtered by an image transfer function. The direct down-conversion front end receiver includes an IQ mismatch calibration block for receiving the overall down-converted baseband signal and the baseband PRBS signal, and estimating the signal transfer and the image transfer functions affecting the baseband PRBS signal in the presence of the overall down-converted baseband signal, an IQ mismatch compensation block for receiving the overall down-converted baseband signal and the estimated signal transfer and image functions, and generating an IQ compensated baseband signal. The direct down-conversion front end receiver furthermore includes a PRBS cancellation block for receiving the IQ compensated baseband signal, baseband PRBS signal, and the estimated signal transfer and the image transfer functions, and cancelling PRBS components from the IQ compensated baseband signal and the estimated signal transfer and the image transfer functions, to generate an IQ compensated baseband input signal free of PRBS components.

Other and additional aspects and example embodiments are provided in the drawings and the detailed description that follow.

The drawings referred to in this description are not to be understood as being drawn to scale except if specifically noted, and such drawings are only exemplary in nature.

DETAILED DESCRIPTION

Figure 2:
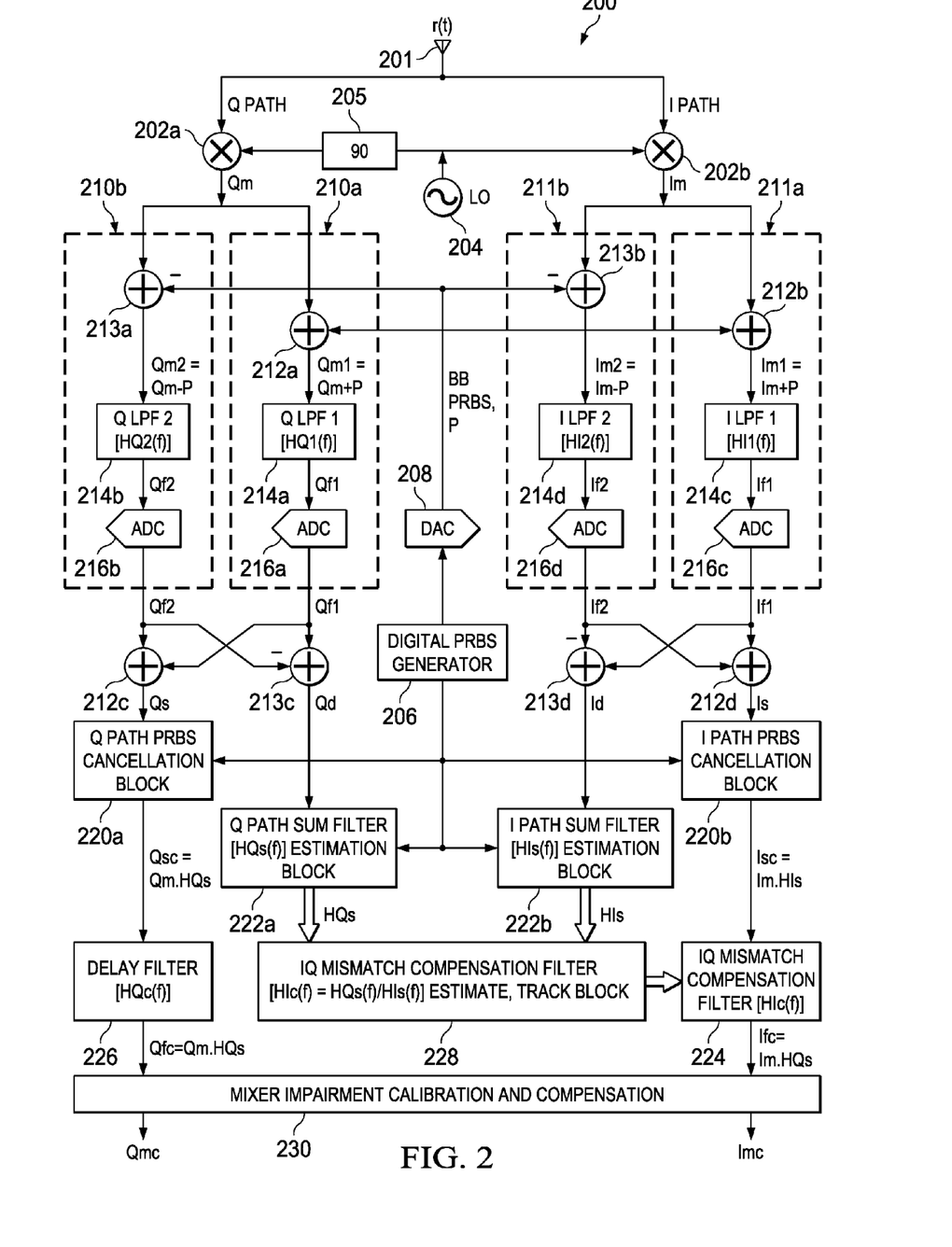
FIG. 2 is a schematic block diagram of a DDC front end receiver, in accordance with an embodiment of the present disclosure.

Referring to FIG. 2, a schematic block diagram of a dual channel direct-down-conversion (DDC) front end receiver 200, in accordance with an embodiment of the present disclosure is illustrated. The dual channel DDC front end receiver 200 includes an antenna 201 for receiving an input radio frequency (RF) signal r(t), first and second mixers 202a and 202b for mixing the input RF signal r(t) with first and second orthogonal sinusoid signals, for generating baseband Quadrature (Qm) and Inphase (Im) signals in Q and I paths respectively, a local oscillator (LO) 204 for generating the first sinusoid signal $2 \cdot gI \cdot \cos(2\pi \cdot Fc \cdot t + \Phi I)$ of centre frequency $F_c$, and a 90 degree phase shifter 205, connected to the LO 204 for generating the second sinusoid signal $-2 \cdot gQ \cdot \sin(2\pi \cdot F_c \cdot t + \Phi Q)$ orthogonal to the first sinusoid signal. The gI and gQ are amplitudes of the first and second sinusoid signals respectively, and $\Phi I$ and $\Phi Q$ are phases of the first and second sinusoid signals respectively. The unequal values of gI and gQ, and unequal values of $\Phi I$ and $\Phi Q$ introduces mismatch between baseband Quadrature (Qm) and Inphase (Im) signals.

The dual channel DDC front end receiver 200 further includes a digital pseudo random binary sequence (PRBS) generator 206 for generating a PRBS signal, and a Digital to Analog Converter (DAC) 208 connected to the PRBS generator, for converting the generated PRBS signal to an analog baseband PRBS signal P.

In the dual channel DDC front end receiver 200, each of the Q and I paths includes two channels, for example, the Q-path includes first and second Q-channels 210a and 210b, and the I-path includes first and second I-channels 211a and 211b.

In the first Q-channel 210a, a first adder 212a adds the baseband Quadrature signal Qm to the baseband PRBS signal P to generate an added Quadrature signal Qm1, represented by the following expression:

$$Qm1 = Qm + P \quad (4)$$

The added Quadrature signal Qm1 passes through a first LPF 214a (of a first quadrature filter response $HQ1(f)$) to generate a first filtered Quadrature signal Qf1, represented by the following expression:

$$Qf1 = Qm1 \cdot HQ1(f) = (Qm+P) \cdot HQ1(f) \quad (5)$$

In the second Q-channel 210b, a first subtractor 213a subtracts the baseband PRBS signal P from the baseband Quadrature signal Qm to generate a subtracted Quadrature signal Qm2, represented by the following expression:

$$Qm2 = Qm - P \quad (6)$$

The subtracted Quadrature signal Qm2 passes through a second LPF 214b (of a second quadrature filter response $HQ2(f)$) to generate a second filtered Quadrature signal Qf2, represented by the following expression:

$$Qf2 = Qm2 \cdot HQ2(f) = (Qm-P) \cdot HQ2(f) \quad (7)$$

First and second ADCs 216a and 216b generate digital samples of the first and second filtered Quadrature signals Qf1 and Qf2 for further processing.

Similarly, in the first I-channel 211a, a second adder 212b adds the baseband Inphase component Im to the baseband PRBS signal P to generate an added Inphase signal Im1, represented by the following expression:

$$Im1 = Im + P \quad (8)$$

The added Inphase signal Im1 passes through a third LPF 214c (of a first inphase filter response $HI1(f)$) to generate a first filtered Inphase signal If1, represented by the following expression:

$$If1 = Im1 \cdot HI1(f) = (Im+P) \cdot HI1(f) \quad (9)$$

In the second I-channel 211b, a second subtractor 213b subtracts the baseband Inphase component Im from the baseband PRBS signal P to generate a subtracted Inphase signal Im2, represented by the following expression:

$$Im2 = Im - P \quad (10)$$

The difference Inphase signal Im2 passes through a fourth LPF 214d (of a second inphase filter response $HI2(f)$) to generate a second filtered Inphase signal If2, represented by the following expression:

$$If2 = Im1 \cdot HI2(f) = (Im-P) \cdot HI2(f) \quad (11)$$

Third and fourth ADCs 216c and 216d generate digital samples of the first and second filtered Inphase signals If1 and If2 for further processing.

Further, in the dual channel DDC front end receiver 200, a third adder 212c adds the first and second filtered Quadrature signals Qf1 and Qf2 to generate a sum quadrature signal Qs, represented by the following expression:

$$Qs = Qf1 + Qf2 = Qm \cdot HQs + P \cdot HQd \quad (12)$$

A third subtractor 213c generates a difference of the first and second filtered Quadrature signals Qf1 and Qf2 to generate a difference quadrature signal Qd, represented by the following expression:

$$Qd = Qf1 - Qf2 = Qm \cdot HQd + P \cdot HQs \quad (13)$$

Where, $HQs$(quadrature sum filter response)$=HQ1(f)+HQ2(f)$ $HQd$(quadrature difference filter response)$=HQ1(f)-HQ2(f)$ The quadrature sum filter response HQs is the overall desired filter response in the Q-path, and Qm, HQs is desired filtered quadrature signal in the Q-path. The quadrature difference filter response HQd is undesired filter response, generally small in magnitude, i.e. less than 40 dB, as $HQ1(f)$ and $HQ2(f)$ have approximately similar values, and $P \cdot HQd$ is undesired differential filtered PRBS signal, that needs to be cancelled from the sum Quadrature signal Qs.

Similarly, a fourth adder 212d generates a sum Inphase signal Is of the first and second filtered Inphase signals If1 and If2, which is represented by the following expression:

$$Is = If1 + If2 = Im \cdot HIs + P \cdot HId \quad (14)$$

A fourth subtractor 213d generates a difference Inphase signal Id from the first and second filtered Inphase signals If1 and If2, which is represented by the following expression:

$$Id = If1 - If2 = Im \cdot HId + P \cdot HIs \qquad (15)$$

Where, $HIs$(Inphase sum filter response)=$HI1(f)+HI2(f)$ $HId$(Inphase difference filter response)=$HI1(f)-HI2(f)$ The inphase sum filter response HIs is the overall desired filter response in the I-path, and Im·HIs is desired filtered inphase signal in the I-path. The inphase difference filter response HId is an undesired filter response, and is generally small in magnitude, i.e. less than 40 dB, as $HI1(f)$ and $HI2(f)$ have approximately similar values, and P·HId is undesired differential filtered PRBS signal, that needs to be cancelled from the sum Inphase signal Is.

The dual channel DDC front end receiver 200 further includes Q-path and I-path PRBS cancellation blocks 220a and 220b for receiving sum Quadrature and Inphase signals Qs and Is, and cancelling corresponding differential filtered PRBS components P·HQd and P·HId therefrom, to generate modified quadrature and inphase signals Qsc and Isc that are free of PRBS signals, such that, $$Qsc = Qs - P \cdot HQd = Qm \cdot HQs \qquad (16)$$

$$Isc = Is - P \cdot HId = Im \cdot HIs \qquad (17)$$

The dual channel DDC front end receiver 200 further includes Q-path and I-path sum filter estimation blocks 222a and 222b, for receiving difference Quadrature and Inphase signals Qd and Id respectively, and estimating quadrature and inphase sum filter responses HQs and HIs associated with sum filtered PRBS components P·HQs and P·HIs, based on a PRBS based filter estimation technique explained in detail with reference to FIG. 3.

There is a mismatch between quadrature and inphase sum filter responses HQs and HIs, due to filter mismatch in first through fourth filters 214a till 214d. In order to compensate the mismatch due to filter impairment, an IQ mismatch compensation filter 224 (having filter response HIc(f)=HQs(f)/HIs(f)) is provided in the I-path and an appropriate delay filter 226 is provided in the Q-path to compensate the filter mismatch.

The dual channel DDC front end receiver 200 further includes an IQ mismatch compensation filter estimate block 228, for receiving quadrature and inphase sum filter responses HQs and HIs, and generating an IQ mismatch compensation filter response HIc(f), represented by the following expression:

$$HIc(f) = HQs(f)/HIs(f) \qquad (18)$$

In an example scenario, the IQ mismatch compensation filter estimate and tracking block 228 estimates the compensation filter response HIc(f) from HIs(f) and HQs(f), such that HQs(f)=HIs(f)*HIc(f) using existing "Recursive Deconvolution" techniques.

The IQ mismatch compensation filter 224 generates a filter compensated Inphase signal Ifc based on the IQ mismatch compensation filter response HIc(f) estimated by the IQ mismatch compensation filter estimate and tracking block 228, where Ifc is represented by the following expression:

$$Ifc = Im \cdot HIs \cdot HIc = Im \cdot HIs \cdot (HQs/HIs) = Im \cdot HQs \qquad (19)$$

Alongside, the delay filter 226 generates a filter compensated Quadrature signal Qfc, represented by the following expression:

$$Qfc = Qm \cdot HQs \qquad (20)$$

As seen in equations 18 and 19, both the filter compensated Quadrature and inphase signals Qfc and Ifc have identical filter response component HQs, and therefore there is approximately no filter mismatch between the filter compensated Quadrature and inphase signals Qfc and Ifc.

The dual channel DDC front end receiver 200 further includes a mixer impairment calibration and compensation block 230, for receiving filter compensated quadrature and inphase Qfc and Ifc signals, and applying mixer impairment calibration and compensation thereon, to generate mixer compensated Quadrature and Inphase Qmc and Imc signals respectively. The filter compensated quadrature and inphase Qfc and Ifc signals have theoretically only the mixer impairment, which can be calibrated and compensated using well known mixer impairment and calibration techniques.

Figure 3:
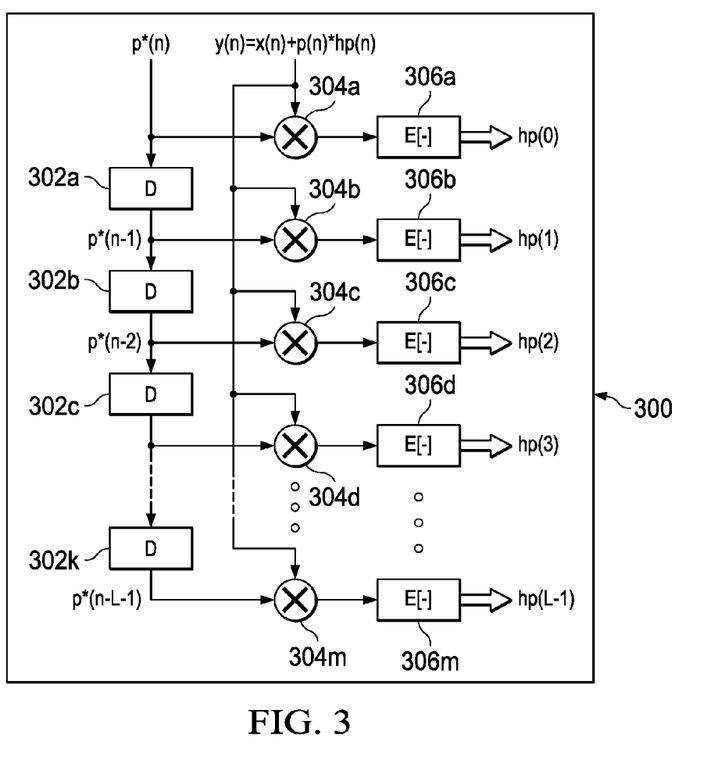
FIG. 3 is a schematic block diagram of a PRBS based filter estimation block for estimating a PRBS based filter response, in accordance with an embodiment of the present disclosure.

FIG. 3 is a schematic block diagram of a PRBS based filter estimation block 300 for estimating PRBS based filter response, in accordance with an embodiment of the present disclosure. The PRBS based filter estimation block 300 estimates a filter response function (hp(n)) affecting a PRBS signal p(n) in the presence of a strong signal x(n). An input signal y(n) to the PRBS based filter estimation block 300 is sum of an input signal x(n) and a PRBS signal p(n) filtered by a filter response hp(n) of length Lp. The input signal y(n) can be represented (in time domain) as below where '*' is the time domain convolution operation:

$$y(n) = x(n) + p(n)^* \text{hp}(n) = x(n) + \sum_{k=0}^{Lp-1} p(n-k) \cdot \text{hp}(k) \qquad (21)$$

In an embodiment of the present disclosure, the PRBS based filter estimation block 300 is employed in Q and I paths sum filter estimation blocks 222a and 222b, for determining sum filter responses HQs and HIs affecting PRBS signal P in presence of strong signals Qm·HQd and Im·HId respectively, where the input signals y(n) are difference quadrature and inphase signals Qd and Id respectively (See equations 12 and 14).

Referring back to FIG. 3, the PRBS based filter estimation block 300 includes first through L-1 delay elements 302a till 302k for generating L-1 delayed samples of the conjugate PRBS signal p*(n), first through L multipliers 304a till 304m for multiplying the input signal y(n) with L number of samples of the conjugate PRBS signal p*(n). The multiplication of the input signal y(n) with p*(n-m) (where * is the complex conjugate operation) for 0≤m≤Lp-1 is represented by the following expression:

$$y(n) \cdot p^*(n-m) = x(n) \cdot p^*(n-m) + \sum_{k=0}^{Lp-1} p(n-k) \cdot \text{hp}(k) \cdot p^*(n-m) \Rightarrow \qquad (22)$$

$$y(n) \cdot p^*(n-m) = \text{hp}(m) \cdot |p(n-m)|^2 +$$

$$\sum_{k=0, k \neq m}^{Lp-1} p(n-k) \cdot \text{hp}(k) \cdot p^*(n-m) + x(n) \cdot p^*(n-m)$$

In the equation 21, apart from filter tap coefficient of hp(m), some undesired terms (second term onwards) are also present. By proper choice of PRBS sequence and averaging over large number of samples, the second term can be set as very small or zero. Thus, m'th coefficient of hp(n) is given by following operation with proper scaling for unity PRBS power $$hp(m)=En[y(n)\cdot p^*(n-m)] \quad (23)$$

where En[.] is the expectation operation over sample index 'n'. The PRBS based filter estimation block 300 includes first through L expectation operation blocks 306a till 306m for generating L coefficients of hp(n).

Figure 4:
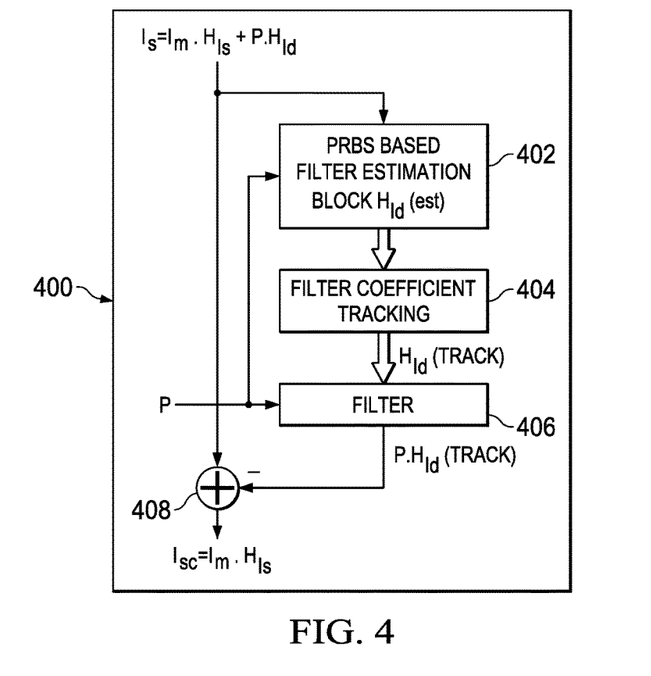
FIG. 4 is a schematic block diagram of a PRBS cancellation block, in accordance with an embodiment of the present disclosure.

FIG. 4 is a schematic block diagram of a PRBS cancellation block 400, which is an example of the I-path PRBS cancellation block 220b, for cancelling differential filtered PRBS component P·HId from the sum inphase signal Is, in accordance with an embodiment of the present disclosure. The PRBS cancellation block 400 includes a PRBS based filter estimation block 402, a filter coefficient tracking block 404, a filter 406, and a subtractor 408.

The PRBS based filter estimation block 402 (similar to the PRBS based filter estimation block 300) receives the sum Inphase signal Is and the baseband PRBS signal P, and generates an estimate of difference filter response HId(est) affecting the PRBS signal P. The filter coefficient tracking block 404 tracks the estimate of difference filter response HId(est) to generate a tracked value of difference filter response HId, i.e. HId(track). The filter 406 filters the PRBS signal P with a tracked value of HId, i.e. HId (track) to generate a differential filtered PRBS component P·HId (track). The subtractor 408 subtracts the differential filtered PRBS component P·HId(track) from the sum inphase signal Is to generate a modified inphase signal Isc that is free of PRBS signal. After the PRBS cancellation, the resulting modified inphase signal Isc is equivalent to mixed down inphase signal Im filtered by the sum filter response HIs (which is similar in characteristics to an individual channel filter). Although not illustrated separately, it would be apparent to one of ordinary skill in the art that the PRBS cancellation block 400 can be used in a similar manner for cancelling differential filtered PRBS component P·HQd component from the sum Quadrature signal Qs to generate a modified Quadrature signal Qsc that is free of PRBS signal P.

In an example scenario, the PRBS cancellation error P*(HId−HId(track)) and P*(HQd−HQd(track)) in the I and Q paths is below −90 dBfs to meet the overall noise floor requirement and an image rejection ratio requirement of being greater than 90 dB. In an example scenario, the PRBS cancellation error is due to filter estimation error, when may occur due to a slight mismatch between differential filter response and corresponding tracked filter response. An IRR of 96 dB for filter mismatch and Signal to residual PRBS power ratio (SPR) of 96 dB is targeted so that overall signal (image+residual PRBS) power ratio of 93 dB is maintained. In order to achieve a filter mismatch IRR of 96 dB, the sum filter responses, HIs and HQs, are estimated to an accuracy ≥96 dB. In order to achieve a SPR of 96 dB, the difference filter responses HId and HQd are estimated to an accuracy ≥96 dB.

Further, while estimation of inphase sum filter response HIs from (Id=Im·HId+P·HIs) and quadrature sum filter response HQs from (Qd=Qm·HQd+P·HQs), for a signal (Im·HId)/(Qm·HQd) of power [Px] dBFS, PRBS signal P of power [Pp] dBFS, the average processing gain ([PG] dB) required for a filter estimation error [Err] dBc w.r.t 0 dBFS is given by following expression:

$$[Px]-[PG] \leq [Pp]+[Err] \Rightarrow [PG] \geq [Px]-[Pp]-[Err] \quad (24)$$

The minimum number of signal samples NSampPG (generated by the each of the ADCs 216a-216d) for achieving the above-mentioned processing gain ([PG] dB) in each of the Q and I paths is given by the following expression:

$$NSampPG \geq 10^{\frac{[PG]}{10}} \quad (25)$$

In an example scenario, when the inphase and quadrature difference filter responses HId and HQd has a signal power level of −40 dBc (i.e) $|HId|^2=-40$ dBc and $|HQd|^2 \leq -40$ dBc, and Inphase and Quadrature Im and Qm signals has a signal power level of 0 dBFS, the effective signal power level [Px] of each of (Im·HId) and (Qm·HQd) is equal to −40 dBFS.

Further, when the baseband PRBS signal P has a signal power level [Pp]=−20 dBFS, and a required filter estimation error [Eerr]≤−90 dBc, then as per equation 23, the required Processing Gain (PG) in each of the Q and I paths is estimated to be greater than or equal to 70 dBc.

As per equation 24, the minimum number of ADC samples (NSampPG) required for a processing gain of 70 dBc is estimated to be $10^7$, which is a drastic reduction as compared to $10^{11}$ samples required in existing single channel PRBS based architecture. At a sampling rate 250 MSPS of ADC, this translates to a calibration time of 40 ms, which is preferable as compared to 400 s in a single channel architecture. Thus, due to low signal power level [Px] of (Im·HId) and (Qm·HQd), the calibration time is reduced, where the low signal power level [Px] of (Im·HId) and (Qm·HQd) is due to presence of low power differential quadrature and inphase filter responses HId and HQd, which in turn is due to suppressing of high power signals on subtraction of filtered signals.

Figure 5A:
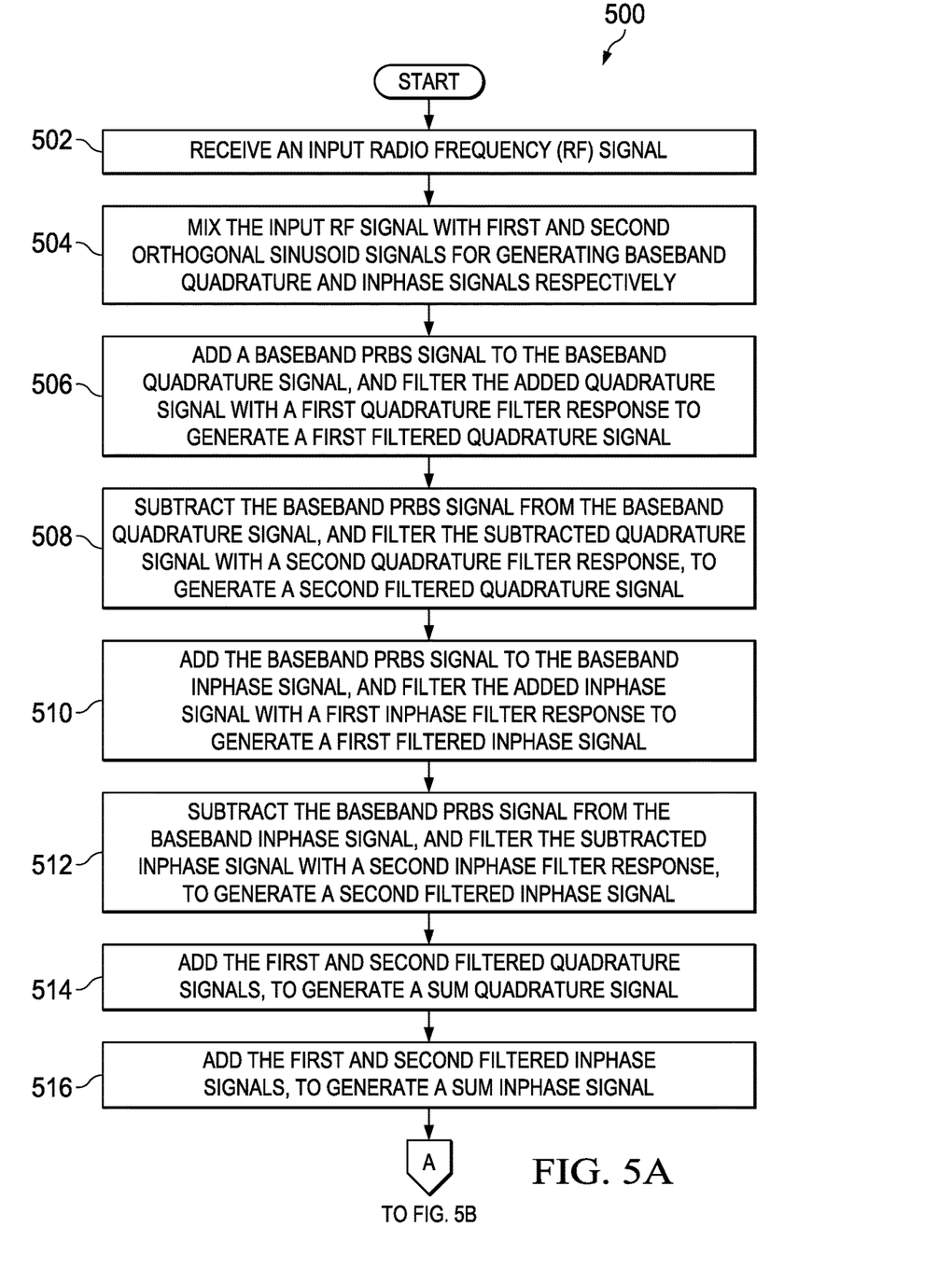
FIGS. 5A and 5B are a flow diagram chart of a method of IQ mismatch calibration and compensation in the DDC front end receiver, in accordance with an embodiment of the present disclosure.
Figure 5B:
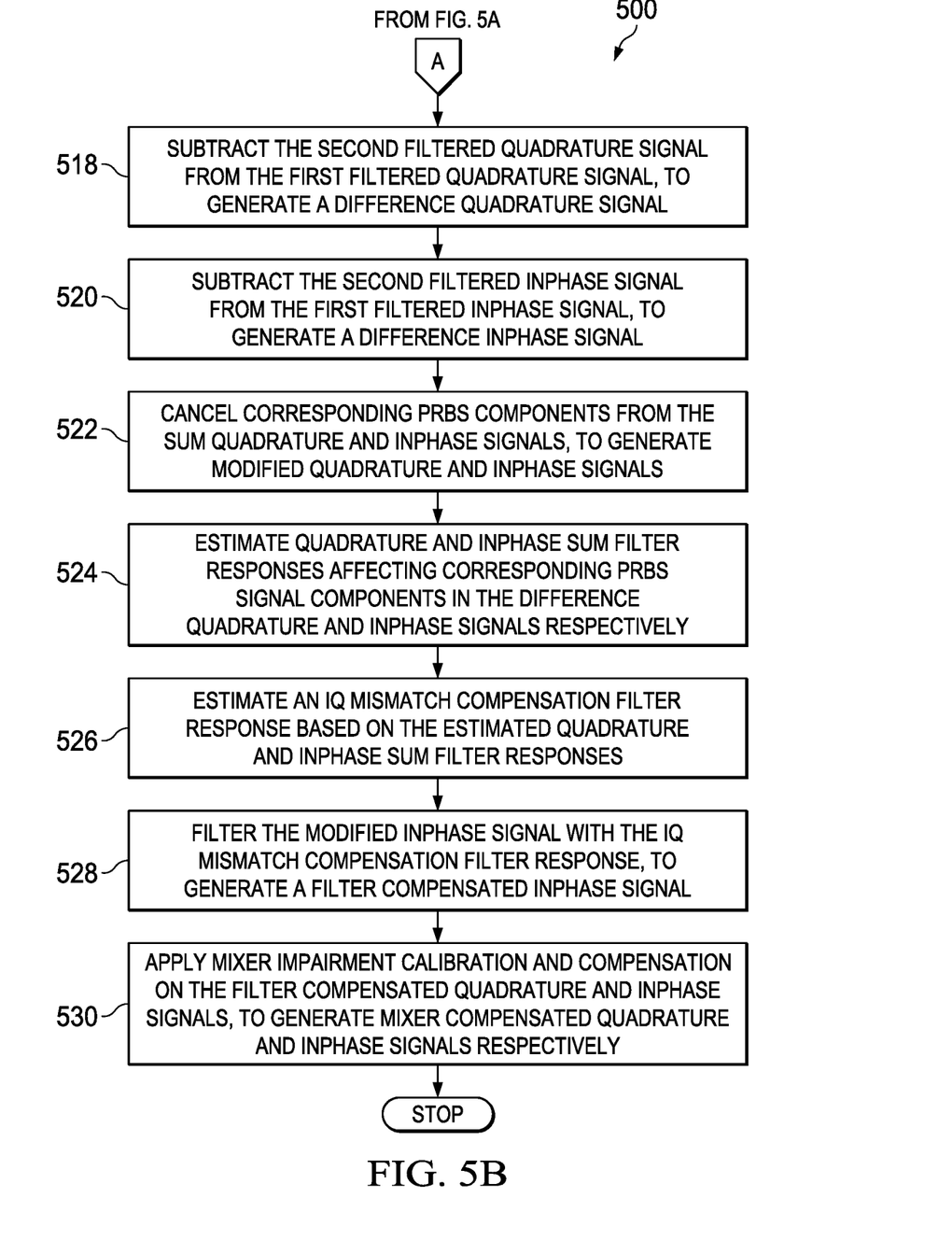

FIGS. 5A and 5B are a flow diagram chart of a method 500 of IQ mismatch calibration and compensation in the dual channel DDC front end receiver, in accordance with an embodiment of the present disclosure. In certain embodiments, operations of the method 500 are performed in the dual channel DDC front end receiver, such as, for example, the DDC front end receiver 200 (see, e.g., FIG. 2).

At block 502, the method includes receiving an input radio frequency (RF) signal r(t).

At block 504, the method includes mixing the input RF signal r(t) with first and second orthogonal sinusoid signals 2·gI·cos(2π·Fc·t+ΦI) and −2·gQ·sin(2π$F_c$·t+ΦQ), for generating baseband inphase (Im) and quadrature (Qm) signals respectively.

At block 506, the method includes adding a baseband pseudo random binary sequence (PRBS) signal P to the baseband quadrature signal Qm, and filtering the added baseband quadrature signal (Qm+P) with a first quadrature filter response (HQ1(f)) to generate a first filtered quadrature signal Qf1.

At block 508, the method includes subtracting the baseband PRBS signal P from the baseband quadrature signal Qm, and filtering the subtracted baseband quadrature signal (Qm−P) with a second quadrature filter response (HQ2(f)), to generate a second filtered quadrature signal Qf2.

At block 510, the method includes adding the baseband PRBS signal P to the baseband inphase signal Im, and filtering the added baseband Inphase signal (Im+P) with a first inphase filter response (HI1(f)), to generate a first filtered inphase signal If1.

At block 512, the method includes subtracting the baseband PRBS signal P from the baseband inphase signal Im, and filtering the subtracted baseband inphase signal (Im−P)

with a second inphase filter response (HI2(f)), to generate a second filtered inphase signal If2.

At block 514, the method includes adding the first and second filtered quadrature signals Qf1 and Qf2, to generate a sum quadrature signal Qs.

At block 516, the method includes adding the first and second filtered inphase signals If1 and If2, to generate a sum inphase signal Is.

At block 518, the method includes subtracting the second filtered quadrature signal Qf2 from the first filtered quadrature signal Qf1, to generate a difference quadrature signal Qd.

At block 520, the method includes subtracting the second filtered inphase signal If2 from the first filtered inphase signal If1, to generate a difference inphase signal Id.

At block 522, the method includes cancelling corresponding PRBS signal components P·HQd and P·HId from the sum quadrature and inphase signals Qs and Is respectively, to generate modified quadrature and inphase signals Qsc and Isc free of PRBS components respectively.

At block 524, the method includes estimating quadrature and inphase sum filter responses HQs and HIs affecting corresponding PRBS signal components P·HQs and P·HIs in the difference quadrature and inphase signals Qd and Id respectively.

At block 526, the method includes estimating an IQ mismatch compensation filter response HIc(f) based on the estimated quadrature and inphase sum filter responses HQs and HIs.

At block 528, the method includes filtering the modified inphase signal Isc with the IQ mismatch compensation filter response HIc(f), to generate a filter compensated inphase signal Im·HQs.

At block 530, the method includes applying mixer impairment calibration and compensation on the filter compensated quadrature and inphase signals Qfc and Ifc, to generate mixer compensated quadrature and inphase signals Qmc and Imc respectively.

Figure 6:
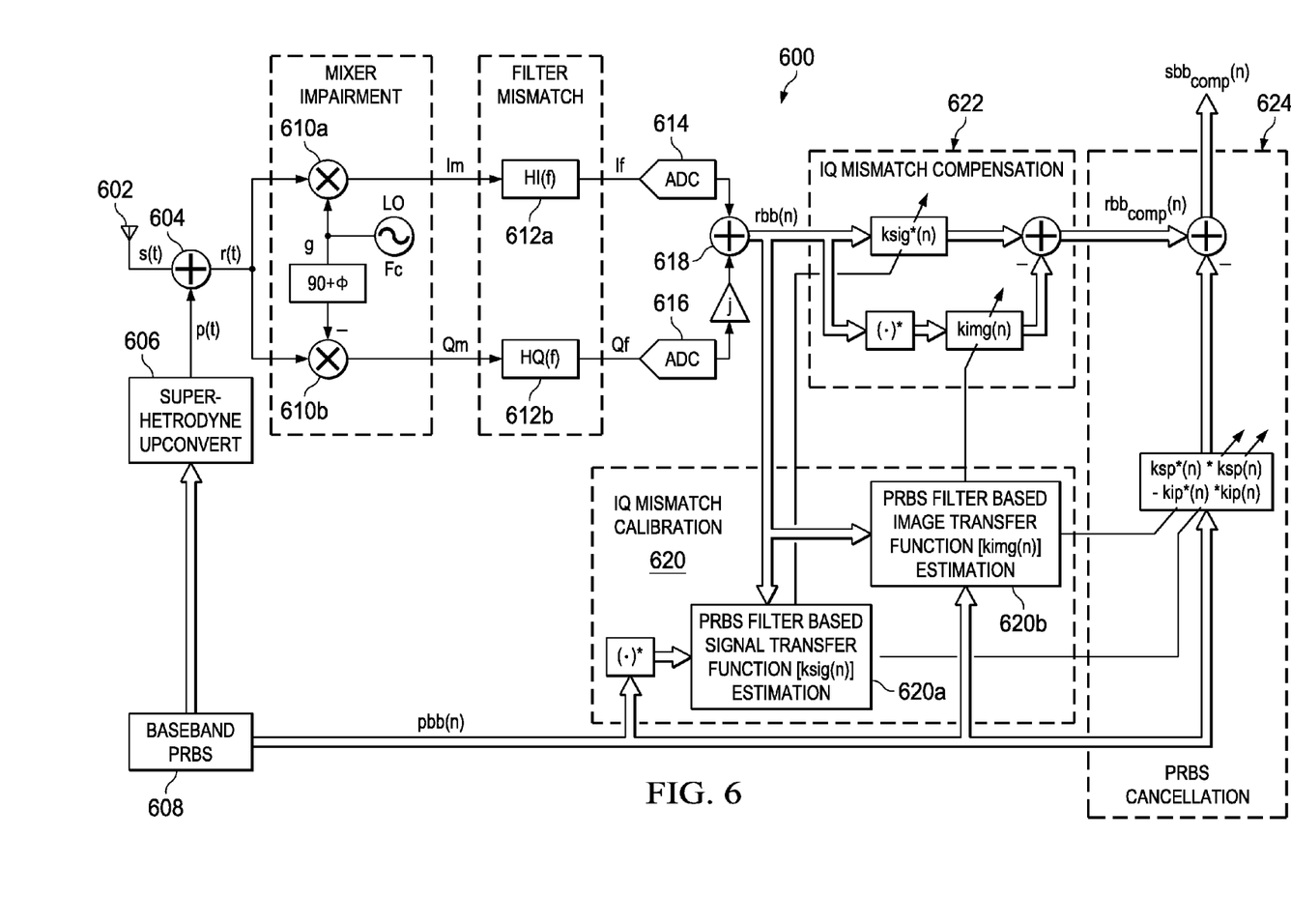
FIG. 6 is a schematic block diagram of a DDC front end receiver, in accordance with an embodiment of the present disclosure.

FIG. 6 is a schematic block diagram of a DDC front end receiver 600, in accordance with an embodiment of the present disclosure.

The DDC front end receiver 600 includes an antenna 602 for receiving an input radio frequency (RF) signal s(t), and a signal adder 604 for adding a RF PRBS signal p(t) to the input RF signal s(t), to generate a modified input signal (r(t)=s(t)+p(t)). The DDC front end receiver 600 further includes a super-heterodyne upconverter 606 to up-convert a baseband PRBS signal pbb(n) generated by a baseband PRBS generator 608, to the RF PRBS signal p(t).

The DDC front end receiver 600 further includes first and second mixers 610a and 610b for receiving the modified input signal (r(t)=p(t)+s(t)) and generating modified baseband Inphase (Im) and Quadrature (Qm) signals respectively, and first and second LPFs 612a and 612b for filtering the modified baseband Inphase (Im) and Quadrature (Qm) signals, to generate filtered Inphase (If) and Quadrature (Qf) signals respectively. There is a mismatch between the modified baseband Quadrature (Qm) and Inphase (Im) signals due to mixer impairment, and there is a further mismatch between filtered Quadrature (Qf) and Inphase (Qf) signals due to filter mismatch. In addition to the input RF signal s(t), the injected PRBS signal (p(t)) also undergoes IQ impairment.

ADCs 614 and 616 receive the filtered Quadrature (Qf) and Inphase (If) signals and generate digital versions of corresponding signals. An adder 618 generates an overall down-converted BB signal $r_{bb}(n)$ from real Quadrature (Qf(n)) and Inphase (If(n)) signals. The overall down-converted baseband signal $r_{bb}(n)$ is represented by the following expression:

$$r_{bb}(n) = k_{sig}(n) * s_{bb}(n) + k_{img}(n) * s_{bb}^*(n) + k_{sig}(n) * p_{bb}(n) + k_{img}(n) * p_{bb}^*(n) \quad (26)$$

Where, $k_{sig}(n)$=signal transfer function $k_{img}(n)$=image transfer function, both $k_{sig}(n)$ and $k_{img}(n)$ defined as per equation 3, based on relative filter imbalance (HQ(f)/HI(f)), and relative gain and phase imbalance of the first and second mixers 610a and 610b.

$s_{bb}(n)$=baseband input signal $s_{bb*}(n)$=baseband input image signal $p_{bb}(n)$=baseband PRBS signal $p_{bb*}(n)$=baseband PRBS image signal As seen in equation (26), apart from the desired baseband input signal ($s_{bb}(n)$), a scaled version of an undesired baseband input image signal ($s_{bb}(n))^*$, a scaled version of the PRBS signal ($p_{bb}(n)$), and a scaled version of the undesirable PRBS image signal ($p_{bb*}(n)$) also appears in the overall down-converted baseband signal $r_{bb}(n)$.

An IQ mismatch calibration block 620 includes a PRBS filter based signal transfer function $k_{sig}(n)$ estimation block 620a, and a PRBS filter based image transfer function $k_{img}((n)$ estimation block 620b. In one embodiment, each of the blocks 620a and 620b employ the PRBS based filter estimation block 300 (For e.g., see FIG. 3) to estimate the signal transfer function $k_{sig}(n)$ affecting the PRBS signal $p_{bb}(n)$, and image transfer function $k_{img}(n)$ affecting the PRBS signal $p^*_{bb}(n)$ in presence of the down-converted BB signal $r_{bb}(n)$. In one embodiment, each of the blocks 620a and 620b receives the down-converted signal $r_{bb}(n)$ from the adder 618, and the baseband PRBS signal $p_{bb}(n)$ from the baseband PRBS signal generator 608.

The PRBS filter based signal transfer function estimation block 620a essentially does the match filtering. On match filtering, the signal and image component of the original BB signal undergoes a processing gain of (1/M) in the above expression, accounting for the estimation error in $k_{sig}(t)$. Filtering $r_{bb}(n)$ through matched filter w.r.t $p^*_{bb}(n)$ (i.e) $p_{bb}(-n)$ gives $$r_{bb}(n) * p_{bb}(-n) =$$

$$\begin{cases} k_{sig}(n) * s_{bb}(n) * p_{bb}(-n) + k_{img}(n) * s_{bb}^*(n) * p_{bb}(-n) + \\ k_{sig}(n) * p_{bb}(n) * p_{bb}(-n) + k_{img}(n) * p_{bb}^*(n) * p_{bb}(-n) \end{cases} \Rightarrow$$

$$r_{bb}(n) * p_{bb}(-n) = \begin{cases} k_{sig}(n) * s_{bb}(n) * p_{bb}(-n) + k_{img}(n) * s_{bb}^*(n) * p_{bb}(-n) + \\ k_{img}(n) * R_{pp}(n) \end{cases}$$

$$r_{bb}(n) * p_{bb}(-n) = \hat{k}_{img}(n) = k_{img}(n) + \delta k_{img}(n)$$

The PRBS based filter estimation block 620b also does the match filtering. Filtering $r_{bb}(n)$ through matched filter w.r.t $p_{bb}(n)$ (i.e) $p^*_{bb}(-n)$ gives $$r_{bb}(n) * p_{bb}^*(-n) =$$

$$\begin{cases} k_{sig}(n) * s_{bb}(n) * p_{bb}^*(-n) + k_{img}(n) * s_{bb}^*(n) * p_{bb}^*(-n) + \\ k_{sig}(n) * p_{bb}(n) * p_{bb}^*(-n) + k_{img}(n) * p_{bb}^*(n) * p_{bb}^*(-n) \end{cases} \Rightarrow$$

$$r_{bb}(n) * p_{bb}^*(-n) = \begin{cases} k_{sig}(n) * s_{bb}(n) * p_{bb}^*(-n) + k_{img}(n) * s_{bb}^*(n) * p_{bb}^*(-n) + \\ k_{sig}(n) * R_{pp}(n) \end{cases}$$

$$r_{bb}(n) * p_{bb}^*(-n) = \hat{k}_{sig}(n) = k_{sig}(n) + \delta k_{sig}(n)$$

An IQ mismatch compensation block 622 uses the signal transfer function $k_{sig}(n)$ and image transfer function $k_{img}(n)$ estimated by the IQ mismatch calibration block 620, for compensating the IQ impairment in the overall down-converted BB signal $r_{bb}(n)$, and generates an IQ compensated baseband signal $r_{bb,comp}(n)$, which is represented by the following expression:

$$r_{bb,comp}(n)=k_{sig}*(n)*r_{bb}(n)-k_{img}(n)*r_{bb}*(n) \quad (27)$$

Combining equation 26 and 27, $$r_{bb,comp}(n) = \begin{cases} (k_{sig}*k^*_{sig}(n) - k_{img}*k^*_{img})*S_{bb}(n) + \\ (k_{sig}*k^*_{sig}(n) - k_{img}*k^*_{img})*P_{bb}(n) \end{cases} \quad (28)$$

The IQ mismatch compensation block 622 removes the image component and the PRBS component from the overall down-converted BB signal $r_{bb}(n)$ and generates the IQ compensated baseband signal $r_{bb,comp}(n)$. However, the IQ compensated baseband signal $r_{bb,comp}(n)$ has the $K_{sig}*K_{sig}*P_{bb}$ component which may degrade noise.

A PRBS cancellation block 624 receives the baseband PRBS signal $p_{bb}(n)$ and subtracts the residual PRBS signal ($k_{Sig}(n)*p_{bb}(n)$ and $k_{img}(n)*(p_{bb}*(n))$ from the IQ compensated baseband signal $r_{bb,comp}(n)$ to generate a IQ compensated baseband input signal $s_{bbcomp}(n)$, that is free of PRBS signal.

Figure 7:
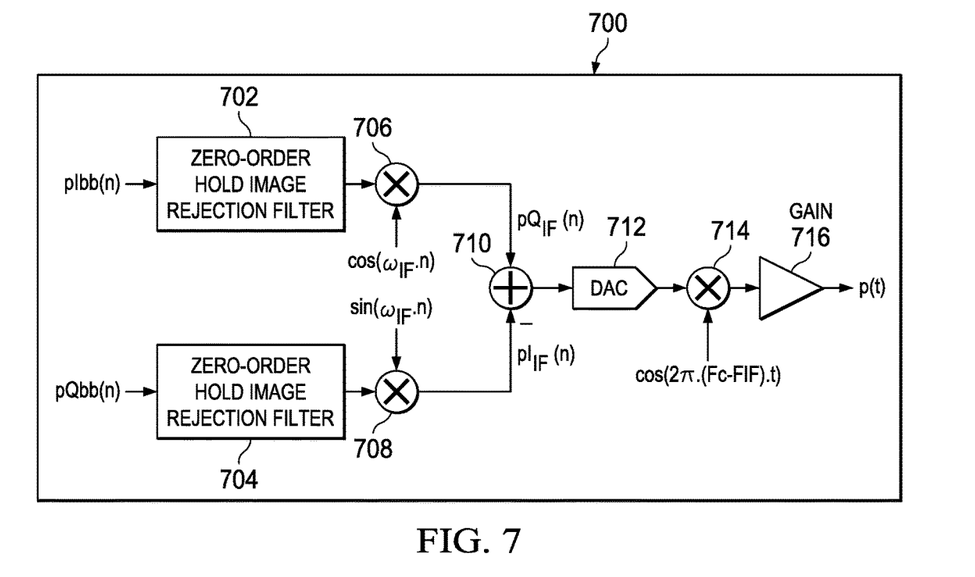
FIG. 7 is a schematic block diagram of a signal generation block for generating a PRBS signal of RF, in accordance with an embodiment of the present disclosure.

FIG. 7 is a schematic block diagram of a signal generation block 700 for generating a PRBS signal of RF, in accordance with an embodiment of the present disclosure. In one embodiment, the signal generation block 700 is placed between the baseband PRBS signal generator 608, and the super heterodyne upconverter 606 to generate the RF PRBS signal, free of any IQ mismatch. The signal generation block 700 includes first and second zero-order hold image rejection filters 702 and 704 for receiving and filtering baseband Quadrature $pQ_{bb}(n)$ and Inphase $pI_{bb}(n)$ PRBS signals, first and second mixers 706 and 708 for up-converting the filtered Quadrature $pQ_{bb}(n)$ and Inphase $pI_{bb}(n)$ PRBS signals to an Intermediate Frequency (IF), in discrete domain. The RF PRBS signal generation block 700 further includes a subtractor 710 for generating a difference of the upconverted Quadrature $pQ_{IF}(n)$ and Inphase $pI_{IF}(n)$ DAC 712 converts the digital difference signal to analog signal, and a third real mixer 714 further upconverts the PRBS signal to the Radio frequency. The third real mixer 714 is an all digital mixer with IF=Fs/4 and is implemented as an adder. This needs the input to be held for 4 clocks. This results in "hold images" which needs to be filtered, further digitally and which generates PRBS at IF without any IQ imbalance. The intermediate Frequency (IF) is upconverted by the third real mixer 714 to the desired RF band. The RF output is gained sufficiently to adequate level before being added to the RF input of the receiver.

Figure 8:
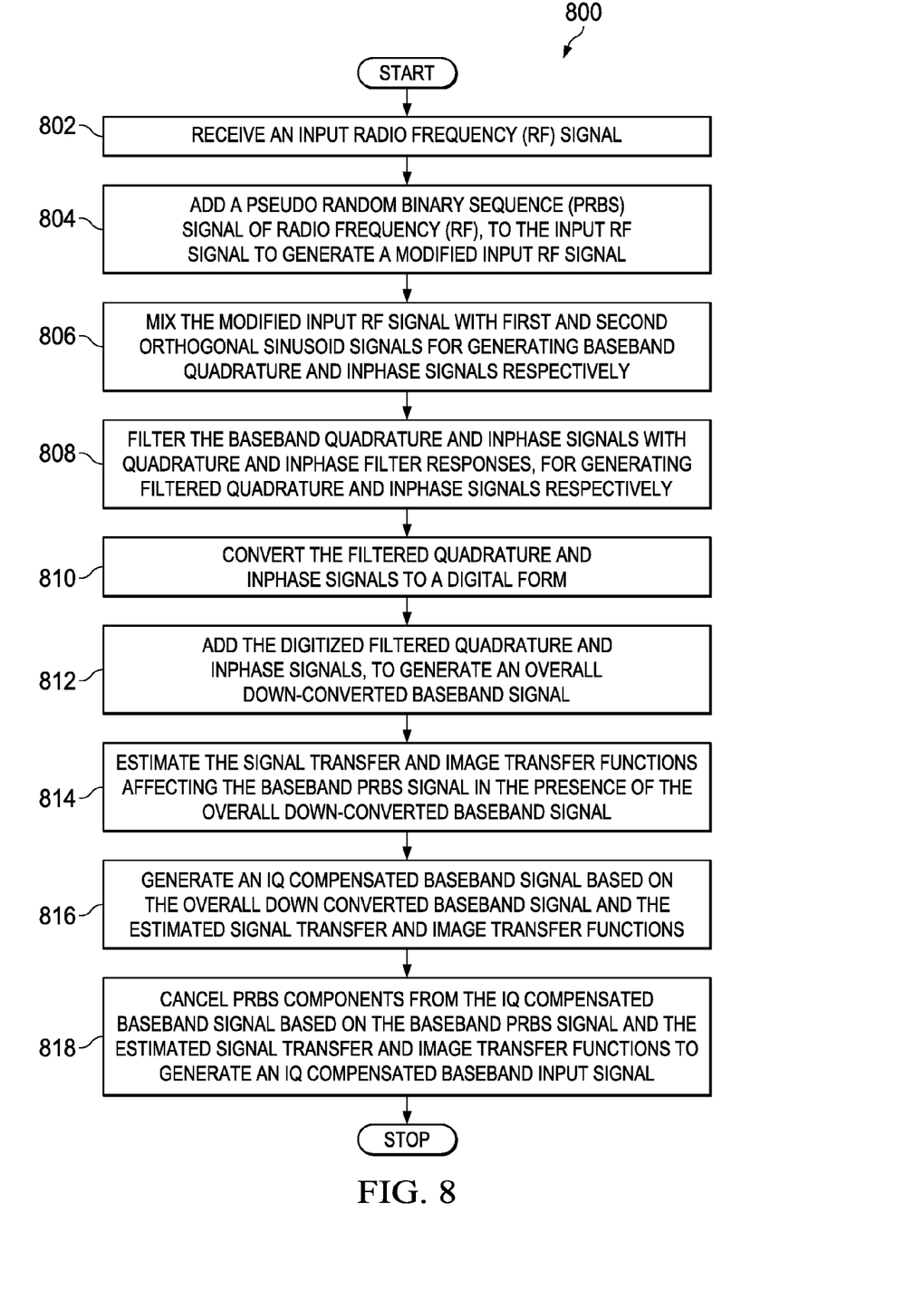
FIG. 8 is a flow diagram chart of a method of IQ mismatch calibration and compensation in the DDC front end receiver, in accordance with an embodiment of the present disclosure.

FIG. 8 is a flow diagram chart of a method of IQ mismatch calibration and compensation in the DDC front end receiver, in accordance with an embodiment of the present disclosure. In certain embodiments, operations of method 800 are performed in the DDC front end receiver, such as, for example, the DDC front end receiver 600 (see, e.g., FIG. 6).

At block 802, the method includes receiving an input radio frequency (RF) signal s(t).

At block 804, the method includes adding a pseudo random binary sequence (PRBS) signal p(t) of Radio frequency (RF), to the input RF signal s(t) to generate a modified input RF signal (r(t)=s(t)+p(t)).

At block 806, the method includes mixing the modified input RF signal (r(t)=s(t)+p(t)) with first and second orthogonal sinusoid signals for generating baseband quadrature (Qm) and inphase (Im) signals respectively.

At block 808, the method includes filtering the baseband quadrature and inphase signals with quadrature and inphase filter responses HQ(f) and HI(f), for generating filtered quadrature Qf and inphase If signals respectively;

At block 810, the method includes converting the filtered quadrature Qf and inphase If signals to a digital form.

At block 812, the method includes adding the digitized filtered quadrature and inphase signals, to generate an overall down-converted baseband signal rbb(n), wherein the overall down-converted baseband signal includes baseband input and PRBS signals filtered by a signal transfer function $k_{sig}$, and the baseband input and PRBS image signals filtered by an image transfer function $k_{img}$.

At block 814, the method includes estimating the signal transfer $k_{sig}$ and image transfer $k_{img}$ functions affecting the baseband PRBS signal $p_{bb}(n)$ and image pbb*(n) respectively, in the presence of the overall down-converted baseband signal $r_{bb}(n)$, based on PRBS based filter the overall down-converted baseband signal and the baseband PRBS signal.

At block 816, the method includes generating an IQ compensated baseband signal $r_{bb,comp}(n)$ based on the overall down-converted baseband signal and the estimated signal transfer and image transfer functions.

At block 818, the method includes cancelling PRBS components from the IQ compensated baseband signal $r_{bb,comp}(n)$ based on the baseband PRBS signal and the estimated signal transfer and image transfer functions, to generate an IQ compensated baseband input signal $sbb,_{comp}(n)$.

Without in any way limiting the scope, interpretation, or application of the claims appearing below, advantages of one or more of the example embodiments disclosed herein include IQ mismatch calibration and compensation with an IRR greater than 90 dB and calibration time less than 500 ms. Various embodiments of the present disclosure provide a dual channel direct down-conversion front end receiver, in which the dual channel architecture enables generation of low power differential filtered signals (Im·HId) and (Qm·HQd), and estimating filter responses based on the low power differential filtered signals result in a decreased calibration time. The minimum number of ADC samples (NSampPG) required for a processing gain of 70 dBc is estimated to be $10^7$, which is a drastic reduction as compared to $10^{11}$ samples required in existing single channel PRBS based architecture. At a sampling rate 250 MSPS of ADC, this translates to a calibration time of 40 ms, which is a significant improvement over a calibration time of 400 s in existing single channel PRBS based architecture. The dual channel DDC front end receiver is not only limited to a Multi carrier GSM (MCGSM) base station, and can be adapted for other radio standards as well.

It should be noted that reference throughout this specification to features, advantages, or similar language does not imply that all of the features and advantages should be, or are in, any single embodiment. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification do not necessarily, refer to the same embodiment.

Various embodiments of the present disclosure, as discussed above, are practiced with steps and/or operations in a different order, and/or with hardware elements in configurations which are different than those which are disclosed. Therefore, although the disclosure has been described based upon these example embodiments, it is noted that certain modifications, variations, and alternative constructions are apparent and well within the spirit and scope of the technology. Although various example embodiments of the present disclosure are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A direct down-conversion front end receiver, comprising
an antenna for receiving an input radio frequency (RF) signal;
first and second mixers connected to the antenna, for mixing the input RF signal with first and second orthogonal sinusoid signals for generating baseband quadrature and inphase signals respectively;
first and second Q-channels connected to the first mixer, wherein the first Q-channel adds a baseband pseudo random binary sequence (PRBS) signal to the baseband quadrature signal, and filters the added baseband quadrature signal with a first quadrature filter response, to generate a first filtered quadrature signal, and wherein the second Q-channel subtracts the baseband PRBS signal from the baseband quadrature signal, and filters the subtracted baseband quadrature signal with a second quadrature filter response, to generate a second filtered quadrature signal;
first and second I-channels connected to the second mixer, wherein the first I-channel adds the baseband PRBS signal to the baseband inphase signal, and filters the added baseband inphase signal with a first inphase filter response, to generate a first filtered inphase signal, and the second I-channel subtracts the baseband PRBS signal from the baseband inphase signal, and filters the subtracted baseband inphase signal with a second inphase filter response, to generate a second filtered inphase signal;
Q-path and I-path PRBS cancellation blocks, wherein the Q-path PRBS cancellation block cancels corresponding PRBS component from a sum of the first and the second filtered quadrature signals to generate a modified quadrature signal, and wherein the I-path PRBS cancellation block cancels corresponding PRBS component from a sum of the first and the second filtered inphase signals to generate a modified inphase signal;
Q-path and I-path sum filter estimation blocks, wherein the Q-path sum filter estimation block estimates a quadrature sum filter response from a difference of the first and the second filtered quadrature signals, and wherein the I-path sum filter estimation block estimates an inphase sum filter response from a difference of the first and the second filtered inphase signals;
an IQ mismatch compensation filter estimate and tracking block, connected to the Q-path and I-path sum filter estimation blocks, for estimating an IQ mismatch compensation filter response from the estimated quadrature and the inphase sum filter responses; and
an IQ mismatch compensation filter, connected to the IQ mismatch compensation filter estimate and tracking block, for filtering the modified inphase signal with the IQ mismatch compensation filter response, to generate a filter compensated inphase signal.

2. The direct-down-conversion front end receiver as claimed in claim 1, further comprising:
a local oscillator for generating the first orthogonal sinusoid signal of a predefined center frequency;
a phase shifter connected to the local oscillator for generating the second orthogonal sinusoid signal orthogonal to the first orthogonal sinusoid signal;
a digital pseudo random binary sequence (PRBS) generator for generating a PRBS signal; and
a Digital to Analog Converter (DAC) connected to the PRBS generator for converting the generated PRBS signal to an analog baseband PRBS signal.

3. The direct-down-conversion front end receiver as claimed in claim 1, wherein the first and the second Q-channels include first and second Analog to Digital converters (ADCs) for receiving the first and the second filtered quadrature signals, and generating one or more digital samples of the first and the second filtered quadrature signals respectively, and wherein the first and the second I-channels include third and fourth ADCs for receiving the first and the second filtered inphase signals, and generating one or more digital samples of the first and the second filtered inphase signals.

4. The direct down-conversion front end receiver as claimed in claim 1, further comprising a delay filter for receiving and delaying the modified quadrature signal by a predefined delay, for generating a filter compensated quadrature signal.

5. The direct down-conversion front end receiver as claimed in claim 4, further comprising a mixer impairment calibration and compensation block, for receiving and applying the mixer impairment calibration and compensation on the filter compensated quadrature and inphase signals, to generate mixer compensated quadrature and inphase signals respectively.

6. The direct down-conversion front end receiver as claimed in claim 1, wherein the quadrature sum filter response is a sum of the first and the second quadrature filter responses, the inphase sum filter response is a sum of the first and the second inphase filter responses, a quadrature difference filter response is a difference of the first and the second quadrature filter responses, and an inphase difference filter response is a difference of the first and the second inphase filter responses.

7. A method of IQ mismatch calibration and compensation in a direct-down-conversion front end receiver, comprising:
receiving an input radio frequency (RF) signal;
mixing the input RF signal with first and second orthogonal sinusoid signals for generating baseband quadrature and inphase signals respectively;
adding a baseband pseudo random binary sequence (PRBS) signal to the baseband quadrature signal, and filtering the added baseband quadrature signal with a first quadrature filter response to generate a first filtered quadrature signal;
subtracting the baseband PRBS signal from the baseband quadrature signal, and filtering the subtracted baseband quadrature signal with a second quadrature filter response, to generate a second filtered quadrature signal;
adding the baseband PRBS signal to the baseband inphase signal, and filtering the added baseband inphase signal with a first inphase filter response, to generate a first filtered inphase signal;
subtracting the baseband PRBS signal from the baseband inphase signal, and filtering the subtracted baseband inphase signal with a second inphase filter response, to generate a second filtered inphase signal;

cancelling corresponding PRBS component from a sum of the first and the second filtered quadrature signals to generate a modified quadrature signal;

cancelling corresponding PRBS component from a sum of the first and the second filtered inphase signals to generate a modified inphase signal;

estimating a quadrature sum filter response based on a difference of the first and the second filtered quadrature signals;

estimating an inphase sum filter response based on a difference of the first and the second filtered inphase signals;

estimating an IQ mismatch compensation filter response based on the estimated quadrature and the inphase sum filter responses; and filtering the modified inphase signal with the IQ mismatch compensation filter response, to generate a filter compensated inphase signal.

8. The method as claimed in claim 7, further comprising delaying the modified quadrature signal by a predefined delay, for generating a filter compensated quadrature signal.

9. The method as claimed in claim 7, further comprising applying mixer impairment calibration and a compensation on the filter compensated quadrature and inphase signals, to generate mixer compensated quadrature and inphase signals respectively.

10. The method as claimed in claim 7, wherein the quadrature sum filter response is a sum of the first and the second quadrature filter responses, the inphase sum filter response is a sum of the first and the second inphase filter responses, a quadrature difference filter response is a difference of the first and the second quadrature filter responses, and an inphase difference filter response is a difference of the first and the second inphase filter responses.

11. A direct down-conversion front end receiver, comprising:

an antenna for receiving an input radio frequency (RF) signal;

a signal adder, connected to the antenna, for adding a pseudo random binary sequence (PRBS) signal of Radio frequency (RF), to the input RF signal to generate a modified input RF signal;

first and second mixers connected to the signal adder, for mixing the modified input RF signal with first and second orthogonal sinusoid signals for generating baseband quadrature and inphase signals respectively;

first and second low pass filters (LPFs) connected to the first and second mixers respectively, for filtering the baseband quadrature and inphase signals with quadrature and inphase filter responses, for generating filtered quadrature and inphase signals respectively;

first and second Analog to Digital Converter (ADCs) connected to the first and second low pass filters (LPFs), for converting the filtered quadrature and inphase signals to a digital form;

an adder connected to the first and the second ADCs for receiving and adding the digitized filtered quadrature and inphase signals, to generate an overall down-converted complex baseband signal, wherein the overall down-converted complex baseband signal includes baseband input and PRBS signals filtered by a signal transfer function, and the baseband input and PRBS image signals filtered by an image transfer function;

an IQ mismatch calibration block for estimating the signal transfer and the image transfer functions affecting the baseband PRBS signal in the presence of the overall down-converted baseband signal, based on the overall down-converted complex baseband signal and the baseband PRBS signal;

an IQ mismatch compensation block for generating an IQ compensated baseband signal based on the overall down-converted complex baseband signal and the estimated signal transfer and the image transfer functions; and a PRBS cancellation block for cancelling PRBS components from the IQ compensated baseband signal based on the baseband PRBS signal, and the estimated signal transfer and the image transfer functions, to generate an IQ compensated baseband input signal.

12. The direct down-conversion front end receiver as claimed in claim 11, further comprising:

a baseband PRBS signal generator for generating the baseband PRBS signal; and a super-heterodyne upconverter, connected to the baseband PRBS signal generator, for receiving and up-converting the baseband PRBS signal to a radio frequency (RF) PRBS signal.

13. The direct down-conversion front end receiver as claimed in claim 11, wherein the IQ mismatch calibration block comprises:

a PRBS filter based signal transfer function estimation block for estimating a signal transfer function associated with the baseband PRBS signal in the presence of the overall down-converted complex baseband signal; and a PRBS filter based image transfer function estimation block for estimating an image transfer function associated with the baseband PRBS image signal in the presence of the overall down-converted complex baseband signal.

14. The direct down-conversion front end receiver as claimed in claim 11, wherein the IQ compensated baseband signal $r_{bb,comp}(n)$ is represented by the expression:

$$r_{bb,comp}(n)=k_{sig}*(n)*r_{bb}(n)-k_{img}(n)*r_{bb}*(n)$$

where $r_{bb}(n)$ is the overall down-converted complex baseband signal, $r_{bb}*(n)$ is an overall down-converted baseband image signal, $k_{sig}(n)$ and $k_{img}(n)$ are signal transfer and image transfer functions respectively, and $$r_{bb}(n)=k_{sig}(n)*s_{bb}(n)+k_{img}(n)*s_{bb}*(n)+k_{sig}(n)*p_{bb}(n)+k_{img}(n)*p_{bb}*(n)$$

where $s_{bb}(n)$ is baseband input signal, $s_{bb}*(n)$ is baseband input image signal, $p_{bb}(n)$ is baseband PRBS signal, and $p_{bb*}(n)$ is baseband PRBS image signal.

15. A method of IQ mismatch calibration and compensation in a direct down-conversion front end receiver, comprising:

receiving an input radio frequency (RF) signal;

adding a pseudo random binary sequence (PRBS) signal of Radio frequency (RF), to the input RF signal to generate a modified input RF signal;

mixing the modified input RF signal with first and second orthogonal sinusoid signals for generating baseband quadrature and inphase signals respectively;

filtering the baseband quadrature and inphase signals with quadrature and inphase filter responses, for generating filtered quadrature and inphase signals respectively;

converting the filtered quadrature and inphase signals to a digital form;

adding the digitized filtered quadrature and inphase signals, to generate an overall down-converted complex baseband signal, wherein the overall down-converted complex baseband signal includes baseband input and PRBS signals filtered by a signal transfer function, and the baseband input and PRBS image signals filtered by an image transfer function;

estimating the signal transfer and image transfer functions affecting the baseband PRBS signal in presence of the overall down-converted complex baseband signal, based on the overall down-converted complex baseband signal and the baseband PRBS signal;

generating an IQ compensated baseband signal based on the overall down-converted complex baseband signal and the estimated signal transfer and the image transfer functions; and cancelling PRBS components from the IQ compensated baseband signal based on the baseband PRBS signal, and the estimated signal transfer and the image transfer functions, to generate an IQ compensated baseband input signal.

16. The method as claimed in claim 15, further comprising:

generating a baseband PRBS signal; and filtering with a zero order hold image rejection filter and up-converting the baseband PRBS signal to a radio frequency (RF) PRBS signal.

17. The method as claimed in claim 15, wherein the IQ compensated baseband signal $r_{bb,comp}(n)$ is represented by the expression:

$$r_{bb,comp}(n) = k_{sig}*(n)*r_{bb}(n) - k_{img}(n)*r_{bb}*(n)$$

where $r_{bb}(n)$ is the overall down-converted baseband signal, $r_{bb}*(n)$ is an overall down-converted baseband image signal, $k_{sig}(n)$ and $k_{img}(n)$ are the signal transfer and the image transfer functions respectively, and $$r_{bb}(n) = k_{sig}(n)*s_{bb}(n) + k_{img}(n)*s_{bb}*(n) + k_{sig}(n)*p_{bb}(n) + k_{img}(n)*p_{bb}*(n)$$

where $s_{bb}(n)$ is baseband input signal, $s_{bb}*(n)$ is baseband input image signal, $p_{bb}(n)$ is baseband PRBS signal, and $p_{bb*}(n)$ is baseband PRBS image signal.

* * * * *